United States Patent Office 2,757,856
Patented Aug. 7, 1956

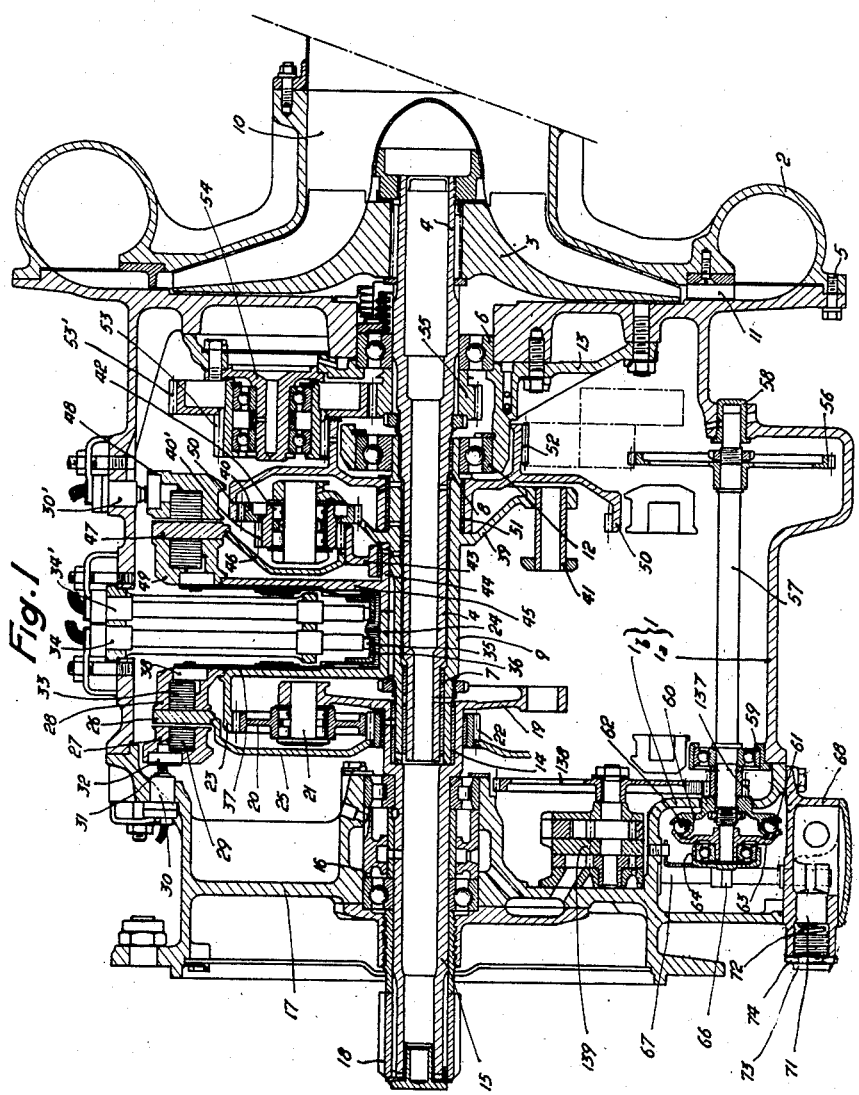

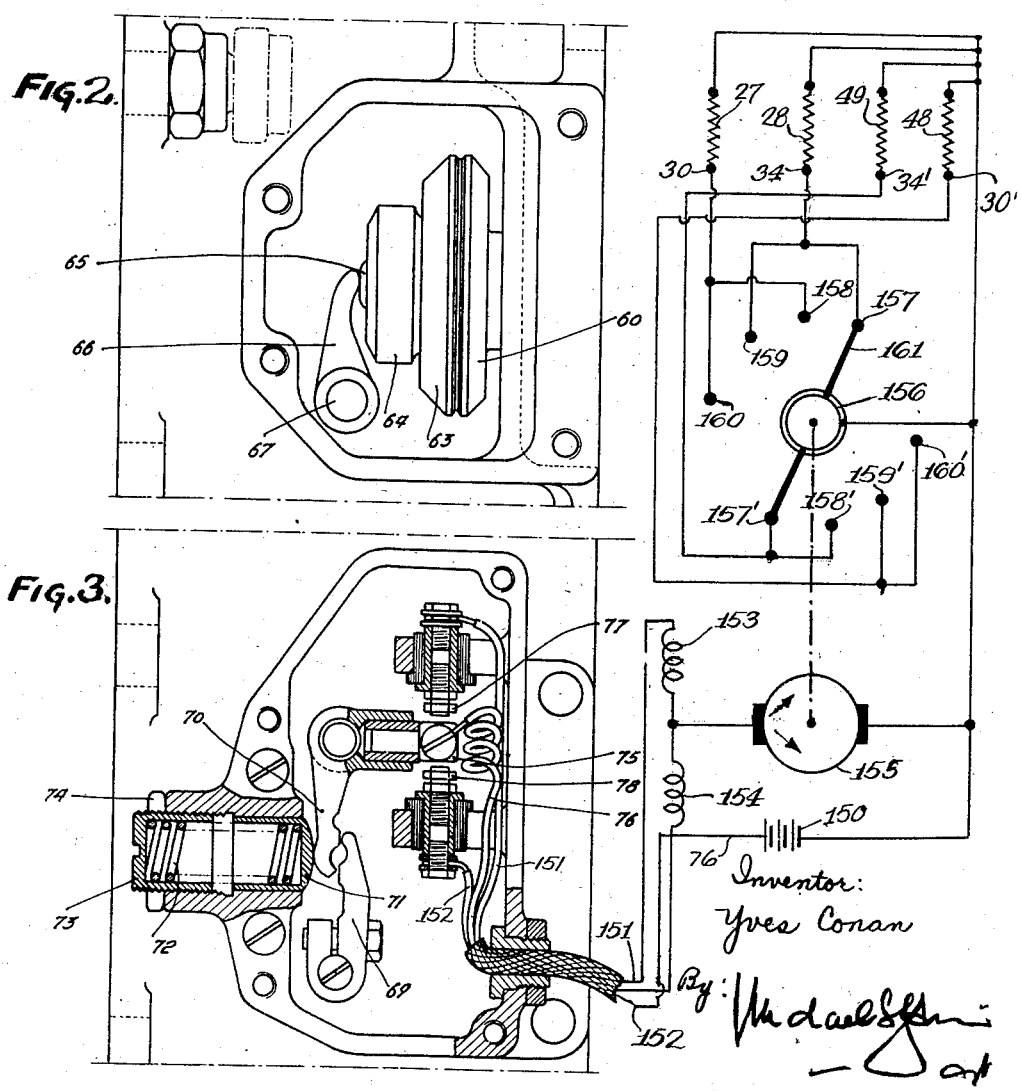

2,757,856

MULTIPLE SPEED CENTRIFUGAL COMPRESSORS

Yves Conan, Enghien, France

Application July 19, 1951, Serial No. 237,520

Claims priority, application France July 28, 1950

1 Claim. (Cl. 230—11)

This invention relates to multiple speed centrifugal compressors intended particularly for use in air-conditioned cabins of airplanes flying at high altitudes, the said compressors being designed to maintain, for instance, a pressure of 560 mm. of mercury in the cabin at an altitude of about 8000 metres. It goes without saying that these figures are given purely as an indication.

It is an object of the invention to provide a system for supplying a compartment of an aircraft with air under pressure wherein power from a variable speed engine is delivered to a compressor through an electro-mechanically controlled transmission.

Another object of the invention is to provide an automatic gear changing device responsive to the speed of the transmission output shaft whereby the compressor is driven at regulated speed from an engine of variable speed.

A further object of the invention is to provide in a system of the character described an automatic gear changing device which comprises a speed governor, of the centrifugal type for instance, which, through a control switch, actuates in either direction an electric motor driving a rotary switch, the said rotary switch selecting the gear-box circuits in such a manner as to obtain the desired rotor speed.

Other special features and characteristics of an improved centrifugal compressor according to the invention are brought out by the following description illustrating one embodiment of the said compressor and given solely as an example as shown in the attached drawing, in which:

Fig. 1 is a lengthwise section of the compressor along its axis;

Fig. 2 is an outside elevation of the speed governor, and

Fig. 3 is a partially sectional inside view of the control switch.

The compressor shown in the drawing comprises a housing 1 consisting of a main part 1a and a bottom 1b, the main part 1a carrying the volute 2 in which the wheel (or rotor) 3, keyed on to the shaft 4, turns and sucks in the conditioning air by an axial inlet 10 and delivers it to the cabin, at the proper pressure, through a diffuser 11 and the volute 2.

The delivery volute 2 is secured on the housing 1a by studs 5 arranged concentrically round the compressor axis, at the angles of a regular polygon, making it possible to adjust the direction of the volute 2 so that the outlet can be pointed in the direction which is most convenient for fitting the pipe carrying the compressed air into the cabin.

The shaft 4 is carried towards the rear, where the blower wheel is, by a ball bearing 6 mounted on the housing 1a, and towards the front and in the center on two bushings 7 and 8 which are in turn carried in a sleeve 9 co-axial with the shaft 4 and forming a secondary shaft.

The rear end of the sleeve or secondary shaft 9 rests in a ball bearing 12 carried on a support 13 secured to the rear end of the housing 1a, while its front end rests on a ring bushing 14 carried by the primary shaft 15.

The primary shaft 15 rests on a carriage 16 with two bearings supported by the strut 17 of the housing 1b; the front of this shaft 15 is provided with driving splines 18, while its rear end terminates in a plate 19.

Three planet pinions 20, arranged concentrically to the axis of the compressor and equidistant by 120°, are mounted on the plate 19; they rotate on cylindrical runners carried by three rods 21 fitted in the plate 19.

These three pinions 20 engage, on the one hand, with a central pinion 22 mounted with a free sliding fit on the primary shaft 15, and, on the other hand, with a crown-wheel 23 having a splined cylindrical extension 24 rotating with the secondary shaft 9.

On the pinion 22 is mounted a circular disc 25 on the outside edge of which is a magnetic steel armature 26 which moves between two electromagnets 27, 28 of the usual type, one of them, 27, being secured to the housing 1a while the other, 28, which is movable, is integral with the crown-wheel 23.

The unit formed by the primary shaft 15, the planet pinions 20, the armature 26, the electromagnets 27 and 28, the central pinion 22 and the sun wheel 23 is the first speed-changing train of the compressor.

The electric feed current for the winding 29 housed in the electromagnet 27 is transmitted by a terminal 30 housed in the strut 17, which presses by means of a spring contact 31 on a plug 32 integral with the electromagnet 27, the return circuit being grounded in the electromagnet and the housing.

The electric feed current for the winding 33 housed in the electromagnet 28 is transmitted by a terminal 34 housed in the housing 1a, which presses by means of a spring contact 35 on a collector ring 36 connected to the winding 33 by the blades 37 and the stud 38, the return circuit also being grounded.

Made integral with the secondary shaft 9 a planet pinion carrying plate 39 actuates three double planet pinions 40, 40' carried on rods 41 integral with the plate 39 which are arranged concentrically to the compressor axis and staggered in relation to each other at 120°. These planet pinions 40, 40' rotate on these rods 41 through cylindrical runners 42. The small teeth corresponding to the member 40 of the double planet pinions 40—40', engage with a central pinion 43 fitted so as to slide freely on the cylindrical extension 44 of a plate 45 rotatingly made fast, by splines, with the secondary shaft 9.

An annular disc 46 is fitted on the pinion 43, and its outside edge is provided with a magnetic steel armature 47 which can move between two electromagnets 48 and 49, one of them, 48, being secured to the housing 1a, the other, 49, mobile, being integral with the plate 45.

Current is supplied to the electromagnets 48 and 49 by the terminals 30' and 34' in identically the same way as to the electromagnets 27 and 28 by the terminals 30 and 34.

The large teeth, corresponding to the member 40 of the double planet pinions 40, 40', engage in a sun wheel 50 journalled by a ringed hub 51 on the secondary shaft 9 and provided at the rear with teeth 52 which engage with three double gears 53, 53' carried by rods 54 secured on the housing and placed concentrically to the compressor axis, being staggered by 120° in relation to each other.

The large teeth 53' of the said double gears engage with a pinion 55 keyed on to the shaft 4 of the wheel.

These three sets of gears with a fixed speed ratio constitute a permanent step up gear the effect of which is to change by a constant coefficient the speed of rotation obtained at the end of the double epicyclic train 40—40'—50.

The manner in which the electromagnetic gear-box works will easily be understood from the foregoing description.

The first speed-changing train is controlled by excitation of the electro-magnets 27 and 28.

When the current is cut off from the two electro-magnets 27 and 28, the armature 26, not being attracted in either direction, takes up a neutral position and rotates freely between the two electro-magnets through the effect of the rotation of the primary shaft 15 carrying the planet pinions 20. The secondary shaft 9, connected to the sun wheel 23, receives the torque due to the passive rotation resistances of the armature 26, turns slowly or not at all, and the compressor is disengaged.

When the electro-magnet 28 is excited, the armature 26 presses against the said electromagnet and makes the central pinion 22 and the sun-wheel 23, and therefore the planet pinions 20, integral with each other; the secondary shaft 9 is driven at the speed of the primary shaft 15.

When the electro-magnet 27 is excited, the armature 26 presses against it and immobilizes the central pinion 22. The planet pinions 20, driven by the primary shaft 15, roll on this fixed central pinion and impart to the sun wheel 23 a speed equal to the driving speed increased by the relative speed due to the train ratio.

It therefore follows that the first train can, as desired, ensure the disconnecting, the actuation of the secondary shaft at the speed of the primary shaft, or the actuation of the secondary shaft at a higher speed than that of the primary shaft.

The second double epicyclic train gives other gear ratios in combination with the first train. It functions in the following manner:

If no current is supplied to the two electro-magnets 48, 49, the central armature 47 can rotate freely between them, and the wheel 3 of the compressor is not set in motion; the compressor is disengaged.

When current is supplied to the mobile electro-magnet 49, the armature 47 presses against the said electro-magnet, blocking the epicyclic system which is made to run at the speed of the secondary shaft 9; the ratio of the train is 1:1 and the sun wheel 50 is made integral with the secondary shaft 9 which causes it to rotate as if it were keyed.

When current is supplied to the electro-magnet 48, the magnetic armature 47 presses against the said fixed electro-magnet, immobilizing the armature and the central pinion 43 which is integral with it. The sun wheel 50 is driven at a speed determined by the train ratio.

By combining the effects of the first and second trains, four different geared-up speeds are obtained by the effect of the permanent remultiplication gear, of which the central pinion 55, fixed on the wheel shaft 4, drives the compressor wheel 3 at one of the said four speeds which can be obtained by the combinations already described.

The compressor is also fitted with an electrical system which enables a suitable speed scale to be obtained, whatever may be the speed of the driving motor.

The principal component of this system is a centrifugal governor shown in Figures 1, 2 and 3.

This governor is actuated by a pinion 56 which engages with one of the three small pinions 53 of the permanent step up gear 53, 53', the speed of which is in a fixed ratio to the speed of the blower wheel. This pinion 56 is fixed on a shaft 57, the rear of which rests in a ring bearing 58 fixed in the housing 1a, while the front thereof rests on a ball bearing 59 housed in a boss of the said housing 1a.

A pinion 137, integral with the shaft 57, drives the oil pumps 139 of the compressor lubricating system through a gear 138.

A plate 60, integral with the shaft 57, is provided with hollows 61 in which are housed balls 62 which, under the influence of the centrifugal force, can move in these hollows 61 away from the axis of the shaft 57, pushing axially a mobile plate 63 mounted slidingly at the end of the shaft 57 inside a ball bearing 64.

This mobile plate 63, through the pin 65 (Fig. 2) drives in rotation a lever 66 made of a piece with a rod 67 carried, on the one hand, in a boss of the housing 1b and, on the other hand, by a boss in a cover 68 fixed on the said housing.

On the lower end of this rod 67 is fixed a second lever 69 (Fig. 3) kept in contact with a third, jointed lever 70 by the action of a push rod 71 with a spring 72 adjustable by means of a threaded plug 73 and a lock-nut 74.

The jointed lever 70 is provided with a contactor 75 connected by the wire 76 to the positive terminal of the source of supply of electric current 150, and which is situated between the two terminals 77 and 78 of which the spacing is adjustable.

The variations in the speed of the compressor wheel as compared with an average, predetermined figure, bring about a radial displacement of the balls 62 and consequently an axial displacement of the mobile sleeve 63 of the governor which, through the lever 66, the rod 67 and the levers 69 and 70, actuates the contactor 75 which presses against one or the other of the two terminals 77 or 78.

The two terminals 77 and 78 are connected through the wires 151 and 152 to the two inductors 153, 154 of the electric motor 155 which is thus adapted to turn in either direction and which, in turn, is operatively connected to an automatic switch 156, the contact studs 157, 158, 159, 160, 157', 158', 159' and 160' of which are suitably connected to the terminals 30, 34, 34' and 30' of the four electromagnets 27, 28, 49 and 48.

When the motor 155 actuates the switch 156 to make it turn in the counter-clockwise direction, the sliding bar 161 successively bears on the studs 157—157', 158—158', 159—159' and 160—160' which results in switching on the electromagnets 28—49, 27—49, 28—48, and 27—48 respectively, i. e. the electros corresponding to the 1st, 2nd, 3rd and 4th speed respectively.

It follows that the governor system just described enables a range of stability of the blower wheel speed to be obtained automatically, and this range can be varied by adjusting the distance between the terminals 77, 78 and the spring push rod 71.

This automatic system is, moreover, completed by circuit breakers operating at the end of the stroke (not shown), which cut off the current from the motor in the corresponding direction when the automatic switch reaches an extreme position.

Furthermore, it is of advantage to have, in addition to this automatic system, a hand control system which permits of obtaining the whole range of compressor speeds and can in particular, comprise a hand switch and a relay for reversing the control, actuated by the said hand switch.

What I claim is:

In a system for supplying a compartment of an aircraft with air under pressure having a variable speed transmission, a compressor connected to the output shaft of said transmission, and control means for said transmission whereby said compressor is driven at regulated speed from an engine of variable speed, said transmission being an electromechanical epicyclic gear box having electrical circuits and electromagnets excited therethrough and said control means comprising a centrifugal governor connected to said output shaft to be driven by the latter, contact means actuated by said centrifugal governor, an electric motor controlled by said contact means so as to turn in one direction or the other in correspondence with the increase or decrease of the speed of said output shaft, an automatic switch rotated by said electric motor for suitably controlling said electrical circuits of said electromechanical gear box.

References Cited in the file of this patent

UNITED STATES PATENTS

| | | |
|---|---|---|
| 1,868,766 | Reynolds | July 26, 1932 |
| 1,963,256 | Bickerstaff | June 19, 1934 |
| 2,174,672 | Von Soden-Fraunhofen | Oct. 3, 1939 |
| 2,339,150 | Codrington | Jan. 11, 1944 |
| 2,374,829 | Nardone | May 1, 1945 |
| 2,418,102 | Vincent | Mar. 25, 1947 |
| 2,425,885 | Jennings | Aug. 19, 1947 |
| 2,427,136 | Hagen | Sept. 9, 1947 |
| 2,485,126 | Wood | Oct. 18, 1949 |
| 2,485,503 | Misch | Oct. 18, 1949 |

FOREIGN PATENTS

| | | |
|---|---|---|
| 597,814 | Great Britain | Feb. 4, 1948 |
| 608,518 | Great Britain | Sept. 16, 1948 |